United States Patent
Awsienko et al.

(12)
(10) Patent No.: US 7,283,464 B2
(45) Date of Patent: Oct. 16, 2007

(54) METHOD AND APPARATUS FOR A SWITCH FABRIC IN A DATA TRANSPORT SYSTEM

(75) Inventors: Oleg Awsienko, Phoenix, AZ (US); Edward Butler, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 09/957,813

(22) Filed: Sep. 20, 2001

(65) Prior Publication Data

US 2003/0063559 A1 Apr. 3, 2003

(51) Int. Cl.
 *H04L 1/00* (2006.01)
(52) U.S. Cl. .............. 370/217; 370/225; 370/242; 370/360
(58) Field of Classification Search ............ 370/360, 370/473, 474, 216–218, 222, 223, 224, 225, 370/227, 228
See application file for complete search history.

(56) References Cited

U.S. PATENT DOCUMENTS

| | | | |
|---|---|---|---|
| 6,188,759 B1* | 2/2001 | Lorenzen et al. | 379/220.01 |
| 6,785,277 B1* | 8/2004 | Sundling et al. | 370/392 |
| 2002/0057699 A1* | 5/2002 | Roberts | 370/395.32 |

OTHER PUBLICATIONS

T. Socolofsky; C. Kale: A TCP/IP Tutorial; Spider Systems Limited; Jan. 1991 (28 pgs).
ISO/IEC 7498-1; Information technology—Open Systems Interconnection—Basic Reference Model: The Basic Model; Second Edition; Nov. 15, 1994 (69 pgs).

* cited by examiner

*Primary Examiner*—Chi Pham
*Assistant Examiner*—Shick Hom
(74) *Attorney, Agent, or Firm*—Grossman, Tucker, Perreault & Pfleger, PLLC

(57) ABSTRACT

Embodiments of a method and/or apparatus for a switch fabric in a data transport system are disclosed.

6 Claims, 3 Drawing Sheets

METHOD AND APPARATUS FOR A SWITCH FABRIC IN A DATA TRANSPORT SYSTEM

BACKGROUND

1. Field

This disclosure relates generally to switches and network switch fabrics.

2. Background Information

Network architectures are typically constructed by dividing complex tasks into smaller tasks, which may be referred to as protocol layers, such as the transport layer or physical layer, for example. There are many types and categories of layers. Layers may also provide information to other layers. A layer typically has one or more associated peer layers, which typically exchange data with their respective peer layers. The physical layer of a set of protocol layers will typically perform the function of transmitting fragments of electronic data between nodes. Fragments of electronic data are typically comprised of a contiguous sequence of digital data pulses, and may comprise a data packet, a portion of a data packet, or one or more data packets. Data is typically exchanged between one or more nodes on an associated network by utilizing couplings between nodes coupled to one or more categories of transmission media. Transmission media may include, for example, fiber optic cable, category 5 (CAT-5) networking cabling, wireless media, or any of a number of other types of transmission media. Typically, the physical layer of a network protocol will transmit fragments of electronic data across one or more associated couplings, which may include one or more switches. Switches may be employed when constructing networks, and may route electronic data between one or more nodes on an associated network. Several switches may exist in a network, and may form one or more switch fabrics. It is desirable for the connectivity of the couplings in an associated switch fabric to be preserved in order to operate an efficient network. Connectivity, in this context, refers to a coupling between two or more nodes, and whether or not the two or more nodes are able to exchange electronic data. As is well-known, there are varying degrees of connectivity, such as partial connectivity or full connectivity, but the claimed subject matter is not limited to any particular type of connectivity. A need exists for a method and apparatus of improving the connectivity of couplings, which may include a technique to repair couplings in the event of a failure.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

As is well-known, computer networks comprise a distributed system of intercoupled data links, and typically serve to exchange data between various locations. Networks architectures are typically designed by partitioning complex tasks into one or more subtasks, also known as layers. A layer typically communicates with one or more peer layers by utilizing a protocol. In this context, a set of related protocols may be referred to as a protocol stack. A protocol, in this context, comprises a set of rules and conventions that may be incorporated when one layer communicates with another layer in an associated network. Communication between layers is typically performed by utilizing an interface. An interface, here, defines what operations or services one layer may perform for another layer. Networks vary in size and speed of data transfer, and are becoming increasingly complex. Computer networks are typically comprised of one or more computers or computing devices coupled to a transmission medium, which may be fiber optic cable, category 5 (CAT-5) networking cabling, wireless media, or any of a number of other types of transmission media. Computers coupled to a transmission medium may comprise servers, personal computers, routers, switches, hubs, or any number of other types of networking or computing platform. In this context, the term computing platform or device refers to any hardware and/or software based system that includes the capability to perform logic and/or arithmetic operations. It includes, without limitation, personal computers, laptop computers, servers, set-top boxes, hand-held devices, and numerous other types of systems. Additionally, there are several different types of networks, including Wide Area Networks (WAN) and Local Area Networks (LAN) to cite two possible examples.

Figure 1:
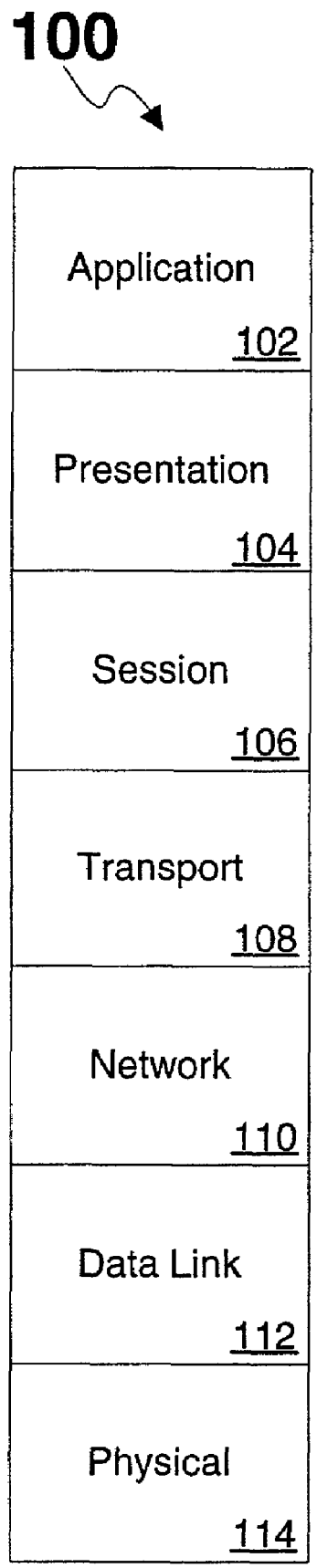
FIG. 1 is an embodiment of a network architecture.

Although the claimed subject matter is not limited in this respect, many different types of network architecture models may be used in accordance with one embodiment of the claimed subject matter. FIG. 1 illustrates one embodiment of a network architecture model, although the claimed subject matter is not limited to just this embodiment. This architecture model is generally known as the OSI (Open Systems Interconnect) model, and the OSI model may typically be used with any number of protocols, including, for example, TCP/IP (Transmission Control Protocol/Internet Protocol). As is well-known, the OSI model was developed by the International Standards Organization (ISO) in order to allow the use of different types of protocols, and provides several guidelines to construct network architectures that will successfully communicate with other network architectures. Details regarding the OSI model are available from the International Standards Organization as document number ISO/IEC 7498:1-1994, or under field number 35.100.01. Details regarding TCP/IP may be obtained by referencing Request For Comments (RFC) 1180, published January 1991.

In the OSI model, 102 is the application layer, which, in this embodiment, performs the primary functions of providing network services to end users, and will generally incorporate a specific protocol for a particular node on an associated network. The application layer may, in operation, attach an application header to a particular set of electronic data, and then pass the electronic data to the presentation layer. 104 is the presentation layer, which, in this embodiment, performs a function of encoding electronic data in a standardized manner, so that it may be passed to other layers that may be utilizing varying protocols. The presentation layer may, in operation, attach a presentation header to a particular set of electronic data, and then pass the electronic data to the session layer. 106 is the session layer, which, in this embodiment, provides for communication, or sessions, between two or more nodes on an associated network. Tasks, such as token management and synchronization, are typically performed in the session layer. The session layer may, in operation, attach a session header to a particular set of electronic data, and then pass the electronic data to the transport layer. 108 is the transport layer, which, in this embodiment, performs functions, such as receiving electronic data from the session layer, and passing at least a portion of the electronic data to the network layer. The transport layer may, additionally, provide information to the session layer. 110 is the network layer, which, in this embodiment, performs the tasks of routing electronic data between one or more nodes on an associated network, and managing electronic data flow between one or more nodes on an associated network. The network layer may, in operation, attach a network header to a particular set of electronic data, and then pass the electronic data to the data link layer. 112 is the data link layer, which, in this embodiment, performs functions, such as formatting electronic data for transmission between layers, and confirming successful transmission and receipt of electronic data between layers. 114 is the physical layer, which, in this embodiment, performs the functions of transmitting bits of electronic data between one or more nodes on an associated network. It will, of course, be understood that the claimed subject matter is not limited to just the OSI model, and may be utilized in a network protocol comprising any number of protocol layers.

Figure 2:
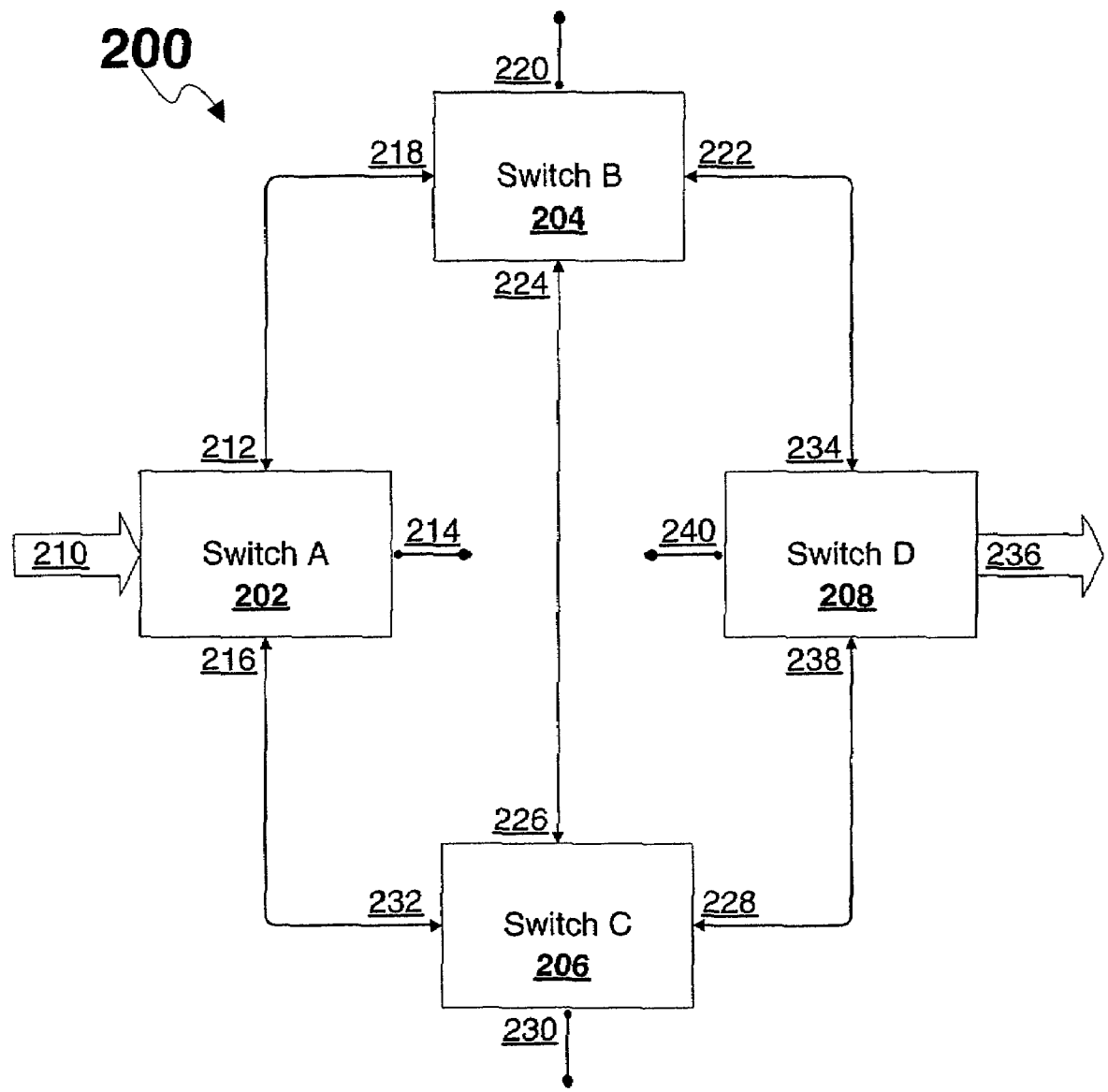
FIG. 2 is a diagram of one embodiment of a switch fabric.

FIG. 2 is diagram of one embodiment of a switch fabric. In this particular embodiment, although the claimed subject matter is not limited in this respect, there are four switches comprising the switch fabric, 202, 204, 206, and 208. A switch, in this embodiment, has four local switch nodes. 202 is comprised of local switch nodes 210, 212, 214 and 216. 204 is comprised of local switch nodes 218, 220, 222 and 224. 206 is comprised of local switch nodes 226, 228, 230 and 232. 208 is comprised of local switch nodes 234, 236, 238, and 240. It will, of course, be understood that the claimed subject matter is not limited to a switch fabric comprised of four switches, or just switches that have four local switch nodes. One or more switches may be located on a computing platform, although the claimed subject matter is not limited in this respect. In this embodiment, a switch has four local switch nodes, and also in this embodiment, a switch has an associated Look Up Table (LUT), although the claimed subject matter is not limited in this respect. In this embodiment, the values of the associated LUTs, shown in table 1, are substantially determined during the enumeration and/or discovery processes. The enumeration process, in this context, is a process where the devices coupled to an associated network are substantially accounted for, such as, for example, a switch fabric accounting for the switches and switch nodes that reside within the fabric. Typically, the discovery process may be incorporated upon the completion of the enumeration process. The discovery process, in this context, is essentially when the priority or preferred routing of electronic data through the fabric is substantially defined. Typically, many paths may exist between one node and another, but a priority path is defined based at least in part on the locations of the nodes, the types of couplings existing between nodes, or any number of other criteria, although the claimed subject matter is not limited in scope to just these criteria for defining a priority route, nor does the claimed subject matter require the utilization of a priority route. This process of enumeration and discovery may alternatively be referred to as a tabularization of substantially all of the local switch nodes and destination nodes of an associated fabric. It will, of course, be understood that these two processes are not required to be implemented in order to practice the claimed subject matter. However, table 1 comprises four sub-tables that are LUTs for switches 202, 204, 206 and 208 of FIG. 2, respectively. The LUTs for switch 202, as well as switches 204, 206 and 208, are as follows:

TABLE 1

| Destination | Primary |
|---|---|
| Switch A | |
| 210 | local |
| 212 | local |
| 214 | local |
| 216 | local |
| 218 | 212 |
| 220 | 212 |
| 222 | 212 |
| 224 | 212 |
| 226 | 216 |
| 228 | 216 |
| 230 | 216 |
| 232 | 216 |
| 234 | 212 |
| 236 | 212 |
| 238 | 212 |
| 240 | 212 |
| Switch B | |
| 210 | 218 |
| 212 | 218 |
| 214 | 218 |
| 216 | 218 |
| 218 | local |
| 220 | local |
| 222 | local |
| 224 | local |
| 226 | 224 |
| 228 | 224 |
| 230 | 224 |
| 232 | 224 |
| 234 | 222 |
| 236 | 222 |
| 238 | 222 |
| 240 | 222 |
| Switch C | |
| 210 | 232 |
| 212 | 232 |
| 214 | 232 |
| 216 | 232 |
| 218 | 226 |
| 220 | 226 |
| 222 | 226 |
| 224 | 226 |
| 226 | local |
| 228 | local |
| 230 | local |
| 232 | local |
| 234 | 228 |
| 236 | 228 |
| 238 | 228 |
| 240 | 228 |
| Switch D | |
| 210 | 234 |
| 212 | 234 |
| 214 | 234 |
| 216 | 234 |
| 218 | 234 |
| 220 | 234 |
| 222 | 234 |
| 224 | 234 |

TABLE 1-continued

| Destination | Primary |
|---|---|
| 226 | 238 |
| 228 | 238 |
| 230 | 238 |
| 232 | 238 |
| 234 | local |
| 236 | local |
| 238 | local |
| 240 | local |

In this embodiment, the associated LUT for a switch defines the primary or priority route that electronic data is passed through to reach an associated destination. 'Primary', in this context, refers to the route that electronic data would utilize when it is being sent from one node to another, if the associated switch couplings are operating properly. 'Destination', in this context, refers to the node to which the electronic data is designated to be at least partially sent. For example, referring to table 1 and FIG. 2, electronic data that is designated for node 236 would, in this embodiment, pass from switch A, 202, through node 212 to node 218. The electronic data would then pass through switch B, 204, through node 222, to node 234. The electronic data would then be passed through switch D, 208, to node 236. This is just an example of one possible route through the switch fabric illustrated in FIG. 2, however. Additionally, a switch fabric is not limited to just this information, and may include additional information relating to routing or other types of related data, and still be in accordance with the claimed subject matter. In this embodiment, the 'local' entry in the associated tables refers to a condition where the destination is a node on the same switch as the source, and no routing information is provided. The LUTs for one or more switches may be stored in hardware, firmware or software, or a combination thereof, and may be stored in the memory of an associated computing platform, or in the memory of an associated switch, depending on the particular embodiment. Additionally, the claimed subject matter is not limited to just the incorporation of a LUT. For example, routing information may be stored in some other data storage format other than a table, for example.

Figure 3:
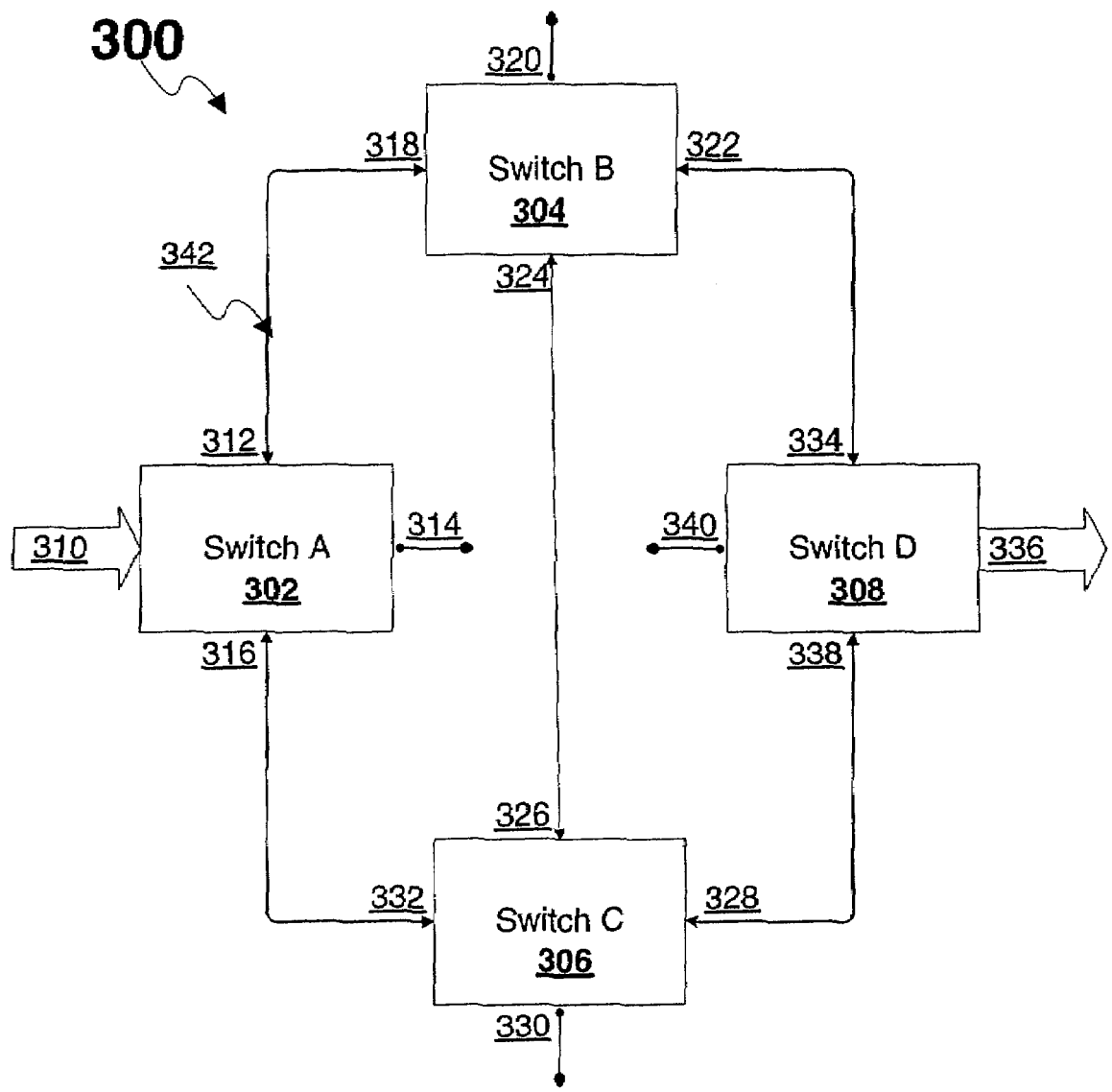
FIG. 3 is a diagram of a switch fabric in accordance with one embodiment of the claimed subject matter.

FIG. 3 is one embodiment of a switch fabric in accordance with one embodiment of the claimed subject matter. FIG. 3 is a switch fabric, and is comprised of four switches, 302, 304, 306 and 308. 302 is comprised of local switch nodes 310, 312, 314 and 316. 304 is comprised of local switch nodes 318, 320, 322 and 324. 306 is comprised of local switch nodes 326, 328, 330 and 332. 308 is comprised of local switch nodes 334, 336, 338, and 340. It will, of course, be understood that the claimed subject matter is not limited to a switch fabric comprised of four switches, or just switches that have four local switch nodes. In this embodiment, although the invention is not limited in this respect, switches 302, 304, 306 and 308 have an associated look up table (LUT). A LUT, in this embodiment, although the claimed subject matter is not limited in this respect, defines the routes for electronic data between nodes in the associated switch fabric. In this embodiment, the values of the associated LUTs, shown in table 2, below, are determined during the enumeration and/or the discovery processes, as explained previously. In this embodiment, the enumeration and/or discovery processes would perform the additional function of defining an alternative route for electronic data passing between one or more nodes, as well as the preferred or priority route. It will, of course, be understood that these two processes are not required to be implemented in order to practice the claimed subject matter. As stated previously, many paths may exist between one node and another, but a priority path is defined based at least in part on the locations of the nodes, the types of couplings existing between nodes, or any number of other criteria, although the claimed subject matter is not limited in scope to just these criteria for defining a priority route, nor does the claimed subject matter require the utilization of a priority route. An alternative route, in this context, may be based on any number of the criteria used for defining a priority route, although the claimed subject matter is not limited in this respect. Table 2 comprises four sub-tables that are LUTs for switches 302, 304, 306 and 308 of FIG. 3, respectively. In this particular embodiment, a LUT has an additional 2 columns as compared to the LUTs associated with FIG. 2. These additional columns are 'F' and 'Failover'. 'F', in this embodiment, defines the status of an associated coupling or link, with logical '0' representing a positive or coupled link, and logical '1' representing a link that has at least partially lost connectivity. In this embodiment, "Failover" defines an alternative route for electronic data, and in this embodiment, the alternative route will be utilized if a primary route has one or more links that have at least partially lost connectivity. A switch fabric that utilizes this alternative routing may be referred to as self-healing switch fabrics, although the claimed subject matter is not limited in this respect. In this embodiment, the alternative route may be determined during the enumeration process, and may be based at least in part on the locations of the nodes, the types of couplings existing between nodes, or any number of other criteria, although the claimed subject matter is not limited in scope to just these criteria for defining an alternative route. Additionally, the claimed subject matter is not limited to just one alternative route, but could define several routes that may be considered alternative, in this context. In this embodiment, the "local" entry in the associated tables refers to a condition where the destination is a node on the same switch as the source, and no routing information is provided. It will, of course, be understood that the claimed subject matter is not limited to just this particular data, and alternative techniques of defining routes for electronic data may be used and still be in accordance with the claimed subject matter. Additionally, the claimed subject matter is not limited to just tables, but other methods of data storage may be used in accordance with the claimed subject matter.

TABLE 2

| Destination | Primary | Failover | F |
|---|---|---|---|
| Switch A | | | |
| 310 | local | local | 0 |
| 312 | local | local | 0 |
| 314 | local | local | 0 |
| 316 | local | local | 0 |
| 318 | 312 | 316 | 1 |
| 320 | 312 | 316 | 1 |
| 322 | 312 | 316 | 1 |
| 324 | 312 | 316 | 1 |
| 326 | 316 | 312 | 0 |
| 328 | 316 | 312 | 0 |
| 330 | 316 | 312 | 0 |
| 332 | 316 | 312 | 0 |
| 334 | 312 | 316 | 1 |
| 336 | 312 | 316 | 1 |
| 338 | 312 | 316 | 1 |
| 340 | 312 | 316 | 1 |

TABLE 2-continued

| Destination | Primary | Failover | F |
|---|---|---|---|
| Switch B | | | |
| 310 | 318 | 324 | 0 |
| 312 | 318 | 324 | 0 |
| 314 | 318 | 324 | 0 |
| 316 | 318 | 324 | 0 |
| 318 | local | local | 0 |
| 320 | local | local | 0 |
| 322 | local | local | 0 |
| 324 | local | local | 0 |
| 326 | 324 | 322 | 0 |
| 328 | 324 | 322 | 0 |
| 330 | 324 | 322 | 0 |
| 332 | 324 | 322 | 0 |
| 334 | 322 | 324 | 0 |
| 336 | 322 | 324 | 0 |
| 338 | 322 | 324 | 0 |
| 340 | 322 | 324 | 0 |
| Switch C | | | |
| 310 | 332 | 326 | 0 |
| 312 | 332 | 326 | 0 |
| 314 | 332 | 326 | 0 |
| 316 | 332 | 326 | 0 |
| 318 | 326 | 328 | 0 |
| 320 | 326 | 328 | 0 |
| 322 | 326 | 328 | 0 |
| 324 | 326 | 328 | 0 |
| 326 | local | local | 0 |
| 328 | local | local | 0 |
| 330 | local | local | 0 |
| 332 | local | local | 0 |
| 334 | 328 | 328 | 0 |
| 336 | 328 | 328 | 0 |
| 338 | 328 | 328 | 0 |
| 340 | 328 | 328 | 0 |
| Switch D | | | |
| 310 | 334 | 338 | 0 |
| 312 | 334 | 338 | 0 |
| 314 | 334 | 338 | 0 |
| 316 | 334 | 338 | 0 |
| 318 | 334 | 338 | 0 |
| 320 | 334 | 338 | 0 |
| 322 | 334 | 338 | 0 |
| 324 | 334 | 338 | 0 |
| 326 | 338 | 334 | 0 |
| 328 | 338 | 334 | 0 |
| 330 | 338 | 334 | 0 |
| 332 | 338 | 334 | 0 |
| 334 | local | local | 0 |
| 336 | local | local | 0 |
| 338 | local | local | 0 |
| 340 | local | local | 0 |

In accordance with one embodiment of the claimed subject matter, a method and/or apparatus for a switch fabric in a data transport system may be comprised of four switches as shown in FIG. 3. These four switches have an associated LUT, in this particular embodiment. The LUT, in this embodiment, defines a primary and alternative route for electronic data, and the utilization of the primary or alternative route depends, at least in part, on the connectivity between two associated nodes in a switch fabric. For example, the primary route between 302 and 304 is the link coupling node 312 and node 318, represented here by 342. This primary route may be seen in table 2, by referencing the destination of 318, and looking in the "primary" column, which references a route through node 312 of Switch A, 302. If, however, link 342 loses connectivity, then the LUT for switch 312 will return a logical '1' for the destination 318. This logical '1' indicates that the electronic data is to be routed through the alternative, failover route indicated in table 2. Referencing destination 318 in table 2, the 'failover' column indicates that the alternative route to node 318 would be through node 316. The electronic data will then be passed through node 316, to switch 306, where table 2 will then be referenced for routing information. In this particular example, since other links may not have lost connectivity, the remaining routing for the electronic data may be through primary routes indicated for switches in the associated LUTs. It will, of course, be understood that this is just one embodiment, and the claimed subject matter is not limited in this respect.

In this particular embodiment, where an associated LUT is utilized to substantially define routing, the routing process described previously may be substantially performed again when additional electronic data is passed through an associated switch fabric. When there is a loss of connectivity between one or more nodes within an associated switch fabric, the alternative routing is utilized for the routing of electronic data, as described previously. In this embodiment, when connectivity is restored to the one or more nodes that has lost connectivity, the 'F' bit in an associated LUT will be reset to logical '0', and the primary route for routing electronic data will be utilized if additional electronic data is passed through an associated switch fabric. It will, of course, be understood that the claimed subject matter is not limited in this respect, however. For example, the logical 'F' bit may not be reset when connectivity is restored, but may alternatively be reset manually, or at a particular time after connectivity is restored. Alternatively, a user may be able to set the logical 'F' bit manually, or override settings by the associated switch fabric. Loss of connectivity, in this embodiment, may be determined by using a number of methods, including by hardware connected to an associated node, and the hardware may detect a loss of electrical connectivity, or a loss of data, although the claimed subject matter is not limited in this respect. Hardware that performs this function may include a transceiver or other type of network hardware, but the claimed subject matter is not limited to a particular type of hardware, or of any particular type of connectivity detection. For example, a connectivity audit may be performed occasionally between one or more nodes, in an alternative method for connectivity detection. It will, of course, be understood that the claimed subject matter is not limited to applications utilizing network switches or switch fabrics. Alternatively, the claimed subject matter may be utilized in any electronic device that at least partially routes data, and where alternative routing and data integrity may be desirable.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. An apparatus comprising:
  two or more switches including a plurality of local switch nodes, said switches including routing information defining paths for routing associated electronic data between said switch nodes of said switches, said routing information identifying destination switch nodes, local switch nodes associated with primary paths for routing said associated electronic data from said local switch nodes to respective said destination switch nodes, and local switch nodes associated with alternative paths for routing said associated electronic data from said local switch nodes, to respective said destination switch nodes;

said two or more switches being coupled with associated couplings between said switch nodes of said switches, such that, in operation, at least one of said two or more switches is configured to alter routing of said associated electronic data between said two or more switches, based at least in part on connectivity of the associated couplings between said two or more switches and on said routing information, wherein said at least one of said switches is configured to alter routing by routing said associated electronic data through a local switch node associated with one of said paths instead of through a local switch node associated with another of said paths;

wherein said routing information further includes status information associated with said destination switch nodes indicating a connectivity status between said local switch nodes of said at least one of said switches and said destination switch nodes, and wherein said at least one of said switches is configured to alter routing from at least one of said primary paths to at least one of said alternative paths if said status information indicates at least partially lost connectivity for said one of said primary paths; and wherein said at least one of said two or more switches is configured to restore routing to said one of said primary paths if said status information indicates that connectivity is restored for said one of said primary paths.

2. The apparatus of claim 1, wherein at least one of said two or more switches has an associated look up table (LUT) including said routing information.

3. The apparatus of claim 1, wherein at least one of said two or more switches comprises a network switch.

4. An apparatus comprising:

a server;

two or more switches including a plurality of local switch nodes, said switches including routing information defining paths for routing associated electronic data between said switch nodes of said switches, said routing information identifying destination switch nodes, local switch nodes associated with primary paths for routing said associated electronic data from said local switch nodes to respective said destination switch nodes, and local switch nodes associated with alternative paths for routing said associated electronic data from said local switch nodes to respective said destination switch nodes; and said server being coupled to said two or more switches, said two or more switches being coupled with associated couplings between said switch nodes of said switches, such that, in operation, at least one of said two or more switches is configured to alter routing of said associated electronic data between said two or more switches, based at least in part on connectivity between said two or more switches and on said routing information, wherein said at least one of said switches is configured to alter routing by routing said associated electronic data through a local switch node associated with one of said paths instead of through a local switch node associated with another of said paths;

wherein said routing information further includes status information associated with said destination switch nodes indicating a connectivity status between said local switch nodes of said at least one of said switches and said destination switch nodes, and wherein said at least one of said switches is configured to alter routing from at least one of said primary paths to at least one of said alternative paths if said status information indicates at least partially lost connectivity for said one of said primary paths; and wherein said at least one of said two or more switches is configured to restore routing to said one of said primary paths if said status information indicates that connectivity is restored for said one of said primary paths.

5. The apparatus of claim 4, wherein at least one of said two or more switches has an associated look up table (LUT) including said routing information.

6. The apparatus of claim 4, wherein at least one of said two or more switches comprises a network switch.

* * * * *